(12) United States Patent
Wang et al.

(10) Patent No.: US 9,219,869 B1
(45) Date of Patent: Dec. 22, 2015

(54) IMAGE CAPTURING DEVICE AND METHOD FOR SHADING COMPENSATION THEREOF

(71) Applicant: Altek Semiconductor Corp., Hsinchu (TW)

(72) Inventors: Tsan-Wei Wang, Taitung County (TW); Shan-Lung Chao, Hsinchu (TW); Hong-Long Chou, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 20 days.

(21) Appl. No.: 14/332,408

(22) Filed: Jul. 16, 2014

(30) Foreign Application Priority Data

Jun. 13, 2014 (TW) .............................. 103120572 A

(51) Int. Cl.
*H04N 9/64* (2006.01)
*H04N 5/238* (2006.01)
*H04N 5/217* (2011.01)
*H04N 5/357* (2011.01)
*G02B 5/02* (2006.01)

(52) U.S. Cl.
CPC ............. *H04N 5/238* (2013.01); *H04N 5/2176* (2013.01); *H04N 5/3572* (2013.01); *G02B 5/0278* (2013.01)

(58) Field of Classification Search
CPC ......................... H04N 13/0207; H04N 5/2353
See application file for complete search history.

(56) References Cited

U.S. PATENT DOCUMENTS

2008/0015802 A1* 1/2008 Urano ................ G01N 21/4738
702/81

* cited by examiner

*Primary Examiner* — Twyler Haskins
*Assistant Examiner* — Carramah J Quiett
(74) *Attorney, Agent, or Firm* — Jianq Chyun IP Office

(57) ABSTRACT

A shading compensation method of an image capturing device, adapted to an image capturing device having a primary lens, a secondary lens, and a diffuser as well as pre-storing a primary-secondary lenses table and a secondary lens-diffuser table, includes the following steps. First, the secondary lens is covered by the diffuser. A scene is simultaneously captured by the primary lens and the secondary lens covered by the diffuser so as to generate a primary image and a diffused image. Next, according to the primary image and the diffused image, a shading compensation table corresponding to the scene is constructed by using the primary-secondary lenses table and the secondary lens-diffuser table. A shading compensation process is then performed on the primary image according to the shading compensation table so as to generate a compensated image.

12 Claims, 4 Drawing Sheets

IMAGE CAPTURING DEVICE AND METHOD FOR SHADING COMPENSATION THEREOF

CROSS-REFERENCE TO RELATED APPLICATION

This application claims the priority benefit of Taiwan application serial no. 103120572, filed on Jun. 13, 2014. The entirety of the above-mentioned patent application is hereby incorporated by reference herein and made a part of this specification.

BACKGROUND OF THE INVENTION

1. Field of the Invention

The present invention generally relates to an image capturing device, in particular, to an image capturing device and a shading compensation method thereof.

2. Description of Related Art

With development in technology, digital cameras and smart phone have become mediums for modern people to record life stories and great moments. To provide more user-friendly features has been a core subject for each manufacturer of the aforesaid image capturing devices.

An optical sensing element such as a charge-coupled device (CCD) element or a complementary metal-oxide semiconductor (CMOS) element may be used in a conventional image capturing device for capturing light entering thereto through a lens. When the light passes through the lens, it may be refracted to produce an image on the sensing element. However, light refraction may cause energy loss so that the refraction angle passing through an edge of the lens is greater than that passing through a center of the lens. The produced image may then be clear in a center and fade off at edges. Such phenomenon is referred to as "vignetting" or "shading" in photography and optics, and may create such non-cohesive image and an adverse visual effect for the user.

Most of the conventional shading compensation algorithms are only adapted to single lens cameras, where one or more lookup tables interpolation mechanism is proposed, and parameters adopted for constructing the lookup table may be a fixed or a plurality of commonly-used light sources. Such lookup table mechanism may provide a solution associated with different color temperatures such as fade edges or color shifts on the produced image, and yet the interpolation parameters or the lookup table may need to be adjusted adaptively according to different light sources. Moreover, the frequency spectrum of different light sources may be drastically different. To adjust the interpolation parameters so that the lookup table satisfies all possible light sources may not be an intuitive implementation. If a scene image is captured under an unknown or composite light source, the shading problem remains unsolved.

SUMMARY OF THE INVENTION

Accordingly, the invention is directed to an image capturing device and a shading compensation method thereof, where a shading compensation table may be adaptively constructed in real-time during image capturing by using ambient light information so as to perform a shading compensation process on the captured image, and a compensated image with high quality may be obtained accordingly.

The invention is directed to a shading compensation method of an image capturing device, adapted to an image capturing device having a primary lens, a secondary lens, and a diffuser. The image capturing device prestores a primary-secondary lenses table associated with the primary lens and the secondary lens as well as a secondary lens-diffuser table associated with the secondary lens and the diffuser. The shading compensation method includes the following steps: covering the secondary lens by using the diffuser; capturing a scene simultaneously by using the primary lens and the secondary lens covered by the diffuser so as to respectively obtain a primary image and a diffused image; constructing a shading compensation table corresponding to the scene by using the primary-secondary lenses table and the secondary lens-diffuser table based on the primary image and the diffused image; and performing a shading compensation process on the primary image according to the shading compensation table so as to generate a compensated image.

According to an embodiment of the invention, before the step of covering the secondary lens by using the diffuser, the shading compensation method further includes the following steps: capturing a light source by using the primary lens and the secondary lens so as to respectively generate a primary testing image and a secondary testing image; covering the secondary lens by using the diffuser, and capturing the light source by using the secondary lens covered by the diffuser so as to generate a diffused testing image; and constructing the primary-secondary lenses table based on the primary testing image and the secondary testing image, and constructing the secondary lens-diffuser table based on the secondary testing image and the diffused testing image.

According to an embodiment of the invention, the steps of constructing the primary-secondary lenses table based on the primary testing image and the secondary testing image, and constructing the secondary lens-diffuser table based on the secondary testing image and the diffused testing image include: calculating a plurality of first ratios according to the primary testing image and the secondary testing image, and constructing the primary-secondary lenses table according to the first ratios, where each of the first ratios is a ratio of a pixel value of each pixel in the primary testing image to a pixel value of a pixel with a same pixel coordinate in the secondary testing image; and calculating a plurality of second ratios according to the secondary testing image and the diffused testing image, and constructing the secondary lens-diffuser table according to the second ratios, where each of the second ratios is a ratio of a pixel value of each pixel in the secondary testing image to a pixel value of a pixel with a same pixel coordinate in the diffused testing image.

According to an embodiment of the invention, the step of constructing the shading compensation table corresponding to the scene by using the primary-secondary lenses table and the secondary lens-diffuser table based on the primary image and the diffused image includes: obtaining a simulated primary image according to the diffused image by using the first ratios in the primary-secondary lenses table and the second ratios in the secondary lens-diffuser table; calculating a plurality of compensation coefficients according to the simulated primary image and the primary image; and constructing the shading compensation table according to the compensation coefficients.

According to an embodiment of the invention, the step of performing the shading compensation process on the primary image according to the shading compensation table so as to generate the compensated image includes: generating the compensation image according to each of the compensation coefficients in the compensation table and the pixel value of each of the pixels in the primary image.

According to an embodiment of the invention, after the step of performing the shading compensation process on the primary image according to the shading compensation table so as to generate the compensated image, the shading compensation method further includes the following steps: when determining that the scene has not changed, capturing the scene by using the primary lens so as to generate a new primary image; and performing the shading compensation process on the new primary image according to the shading compensation table so as to generate a new compensated image.

The invention is also directed to an image capturing device including a primary lens, a secondary lens, a diffuser, a storage unit, and one or more processing units, where a diffuser is connected to the secondary lens, and the processing unit is coupled to the primary lens, the secondary lens, the diffuser, and the storage unit. The storage unit is configured to record a plurality of modules, a primary-secondary lenses table associated with the primary lens and the secondary lens, and a secondary lens-diffuser table associated with the secondary lens and the diffuser. The processing unit is configured to access and execute the modules recorded in the storage unit. The modules include a covering module, an image capturing module, a table constructing module, and a table constructing module. The covering module covers the secondary lens by using the diffuser. The image capturing module captures a scene simultaneously by using the primary lens and the secondary lens covered by the diffuser so as to respectively obtain a primary image and a diffused image. The table constructing module constructs a shading compensation table corresponding to the scene by using the primary-secondary lenses table and the secondary lens-diffuser table according to the primary image and the diffused image. The shading compensation module performs a shading compensation process on the primary image according to the shading compensation table so as to generate a compensated image.

According to an embodiment of the invention, the image capturing device is further coupled to an image processing device. The image capturing module captures a light source by using the primary lens and the secondary lens so as to respectively generate a primary testing image and a secondary testing image. The covering module covers the secondary lens by using the diffuser, and captures the light source by using the secondary lens covered by the diffuser so as to generate a diffused testing image. The image processing device constructs the primary-secondary lenses table based on the primary testing image and the secondary testing image, and constructs the secondary lens-diffuser table based on the secondary testing image and the diffused testing image.

According to an embodiment of the invention, the image processing device calculates a plurality of first ratios according to the primary testing image and the secondary testing image, and constructs the primary-secondary lenses table according to the first ratios. The image processing device also calculates a plurality of second ratios according to the secondary testing image and the diffused testing image, and constructs the secondary lens-diffuser table according to the second ratios. Each of the first ratios is a ratio of a pixel value of each pixel in the primary testing image to a pixel value of a pixel with a same pixel coordinate in the secondary testing image; each of the second ratios is a ratio of a pixel value of each pixel in the secondary testing image to a pixel value of a pixel with a same pixel coordinate in the diffused testing image.

According to an embodiment of the invention, the table constructing module obtains a simulated primary image according to the diffused image by using the first ratios in the primary-secondary lenses table and the second ratios in the secondary lens-diffuser table, calculates a plurality of compensation coefficients according to the simulated primary image and the primary image, and constructs the shading compensation table according to the compensation coefficients.

According to an embodiment of the invention, the shading compensation module generates the compensation image according to each of the compensation coefficients in the compensation table and the pixel value of each of the pixels in the primary image.

According to an embodiment of the invention, the image capturing device further includes a determining module. When the determining module determines that the scene has not changed, the image capturing module captures the scene by using the primary lens so as to generate a new primary image. The shading compensation module performs the shading compensation process on the new primary image according to the shading compensation table so as to generate a new compensated image.

To sum up, according to the image capturing device and the shading compensation method thereof proposed in the invention, a movable diffuser may be disposed in front of a secondary lens of an image capturing device, and a primary-secondary lenses table and a secondary lens-diffuser table may be pre-stored in the image capturing device in a manufacturing stage. In a photo-shooting stage, the image capturing device may use the diffuser to cover the secondary lens so that an image captured by the secondary lens is approximated to an image of a uniformly distributed light source. The image capturing device may further obtain shading compensation information of a captured scene through a real-time computation by using the primary-secondary lenses table and the secondary lens-diffuser table and perform a shading compensation process on the image captured by the primary lens. According to the proposed image capturing device and the shading compensation method in the invention, when a scene is captured, ambient light information of the captured scene may be obtained. Shading compensation tables corresponding to different light sources are not required to be constructed in the manufacturing stage for saving memory space. Moreover, compared with the approach of obtaining a shading compensation table of an unknown light source through an adjustment employed in most of the conventional methods, the shading compensation table proposed in the invention may be adaptively constructed in real-time during image capturing by using ambient light information, and a compensated image with high quality may be obtained accordingly.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
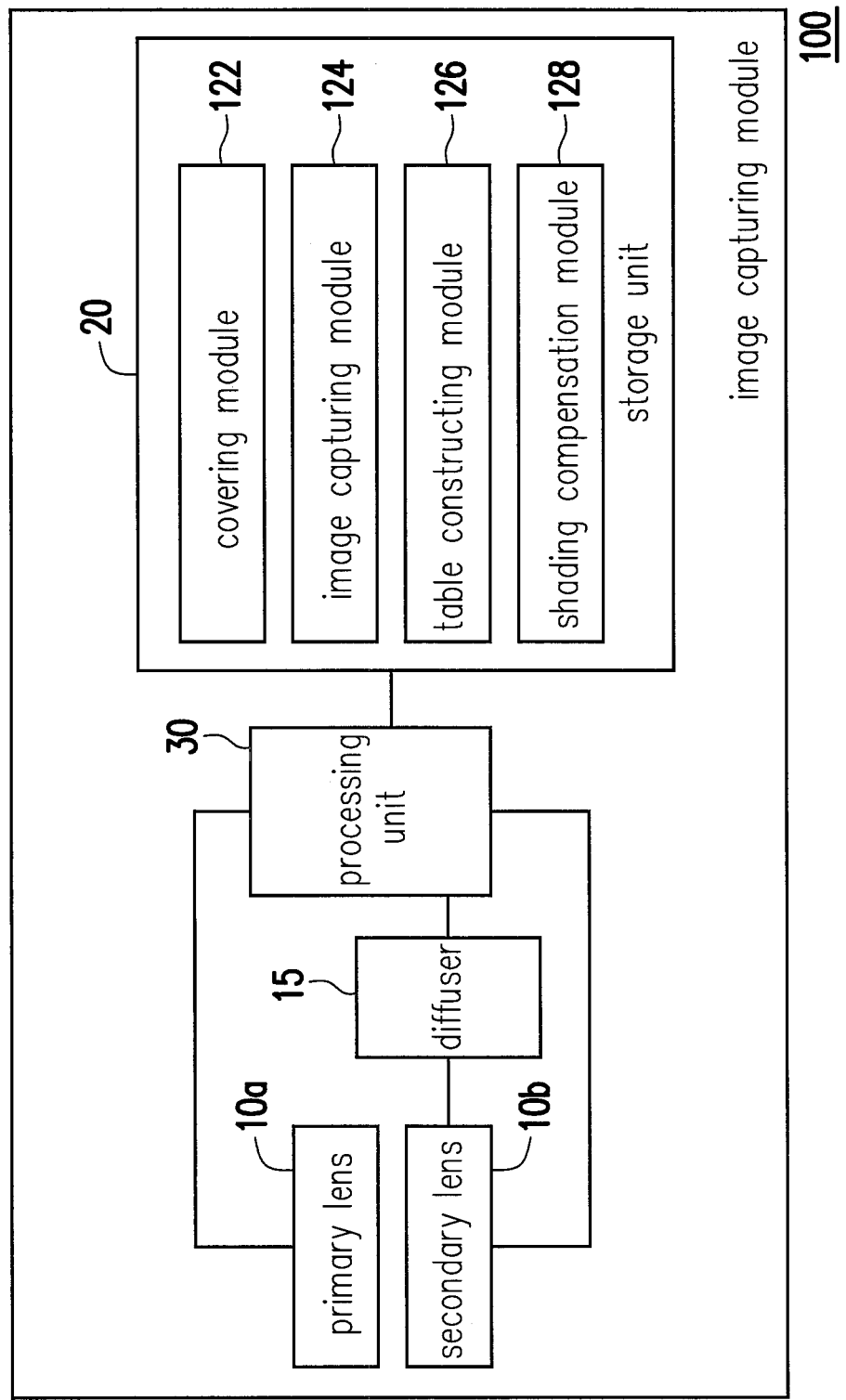
FIG. 1 illustrates a block diagram of an image capturing device according to an embodiment of the invention.

The main idea of the invention is to dispose a movable diffuser in front of a secondary lens during a manufacturing stage of a dual-lens image capturing device. When the image capturing device captures a scene and requires shading compensation information, it may cover the secondary lens by using the diffuser so that an image captured by the secondary lens may be approximated to an image of a uniformly distributed light source. The shading compensation information of the scene may be acquired with real-time computation, and a shading compensation process may be performed on the image captured by the primary lens accordingly.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 illustrates a block diagram of an image capturing device according to an embodiment of the invention. It should, however, be noted that this is merely an illustrative example and the invention is not limited in this regard. All components of the image capturing device and their configurations are first introduced in FIG. 1. The detailed functionalities of the components are disclosed along with FIG. 2.

Referring to FIG. 1, an image capturing device 100 includes a primary lens 10a, a secondary lens 10b, a diffuser 15, a storage unit 20 and one or more processing units 30. In the present embodiment, the image capturing device 100 is, for example, a digital camera, a digital camcorder, a digital single lens reflex camera or other devices provided with an image capturing feature such as a smart phone, a tablet computer, a personal digital assistant, and so on. The invention is not limited herein.

Each of the primary lens 10a and the secondary lens 10b includes optical sensing elements for sensing light intensity entering the primary lens 10a and the secondary lens 10b respectively, so as to generate images. The optical sensing elements are, for example, charge-coupled-device (CCD) elements, complementary metal-oxide semiconductor (CMOS) elements, and yet the invention is not limited herein.

The diffuser 15 may be connected to the secondary lens 10b and disposed in front of the secondary lens 10b. The diffuser 15 is configured to cover the secondary lens 10b when the image capturing device 100 captures an image so as to perform the shading compensation process. The diffuser 15 may adjust the angle and the direction of emitted light through a special optical design on its surface so that the light may be emitted uniformly. When the secondary lens 10 b is covered by the diffuser 15, the captured image may be an image with uniform brightness. In the present embodiment, the diffuser 15 may be ground glass; in other embodiments, the diffuser 15 may be an optical film such as cellophane to allow the light to emit uniformly.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30, where the modules may be loaded into the processing unit 30 for performing a shading compensation method on an image generated by the image capturing device 100.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of aforementioned devices. The processing unit 30 is coupled to the primary lens 10a, the secondary lens 10b, the diffuser 15 and the storage unit 20 and capable of accessing and executing the modules recorded in the storage unit 20 for performing the shading compensation method on the image generated by the image capturing device 100.

The modules include a covering module 122, an image capturing module 124, a table constructing module 126, and a shading compensation module 128 and may be loaded into the processing unit 30 for performing the shading compensation method. The detailed steps of the shading compensation method performed by the image capturing device 100 are illustrated in the embodiments hereinafter.

Figure 2:
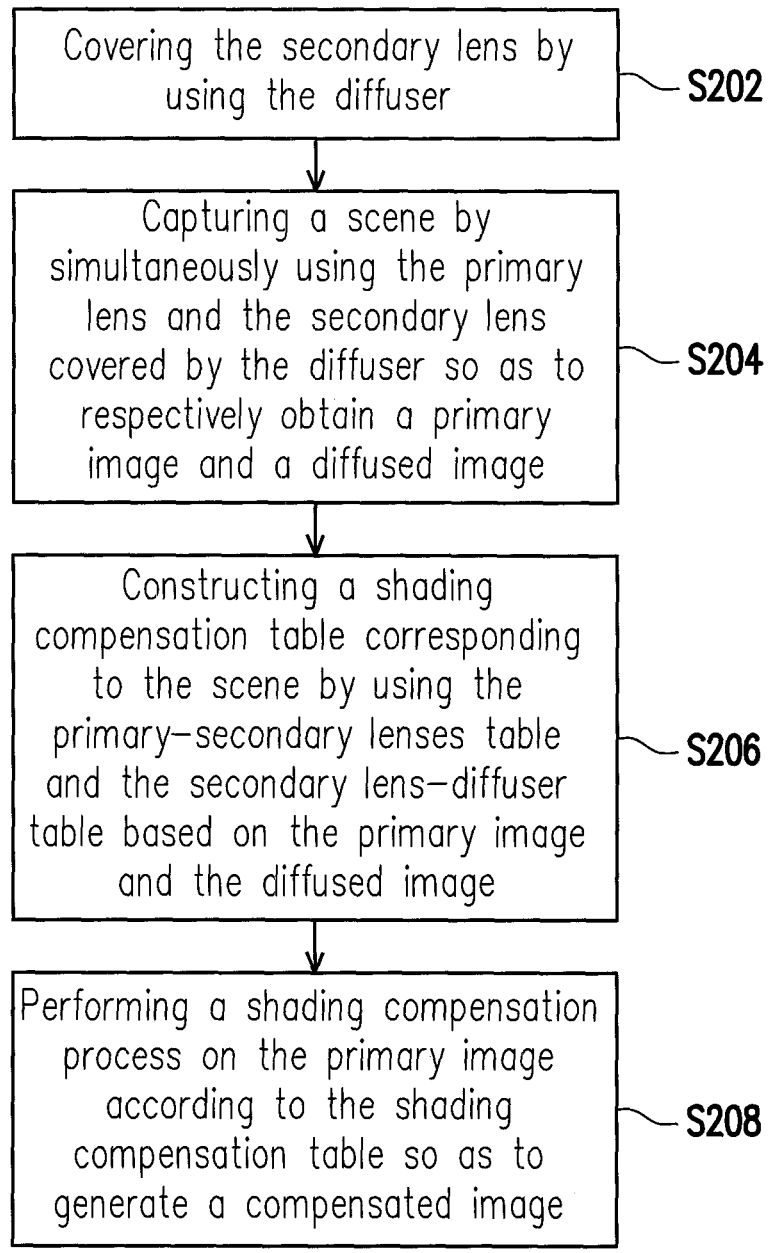
FIG. 2 illustrates a flowchart of a shading compensation method of an image capturing device according to an embodiment of the invention.

FIG. 2 illustrates a flowchart of a shading compensation method of an image capturing device according to an embodiment of the invention, and the shading compensation method of the image capturing device in FIG. 2 may be implemented by the elements in the image capturing device 100 in FIG. 1.

Referring to both FIG. 1 and FIG. 2, first, the covering module 122 of the image capturing device 100 covers the secondary lens 10b by using the diffuser 15 (Step S202), and the image capturing module 124 captures a scene simultaneously by using the primary lens 10a and the secondary lens 10b covered by the diffuser 15 so as to respectively obtain a primary image and a diffused image (Step S204). To be specific, when the user wishes to capture the scene with the image capturing device 100, the covering module 122 may cover the secondary lens 10b by using the diffuser 15. Next, the image capturing module 124 may capture the scene and generate the primary image corresponding to the primary lens 10a and the diffused image corresponding to the secondary lens 10b covered by the diffuser 15.

The content of the primary image is the captured scene. However, due to some limiting factors of the lenses, a shading effect may occur in the primary image captured by the primary lens 10a, where a center of the image is clear and edges of the image fade off. On the other hand, since the diffused image is an image captured by the secondary lens 10b covered by the diffuser 15, the diffused image may be an image with uniform brightness such as an entirely white or entirely gray image. The image capturing device 100 may obtain ambient light information of the scene according to the diffused image and further obtain shading compensation information corresponding to the scene in the follow-up steps.

It should be noted that, before the image capturing device 100 leaves the factory, the primary-secondary lenses table and the secondary lens-diffuser table may be prestored in the storage unit 20 of the image capturing device 100. The primary-secondary lenses table represents a correspondence between a same image respectively captured by the primary lens 10a and the secondary lens 10b, and the secondary lens-diffuser table represents a correspondence between a same image respectively captured by the secondary lens 10b and the secondary lens 10b covered by the diffuser 15.

Figure 3A:
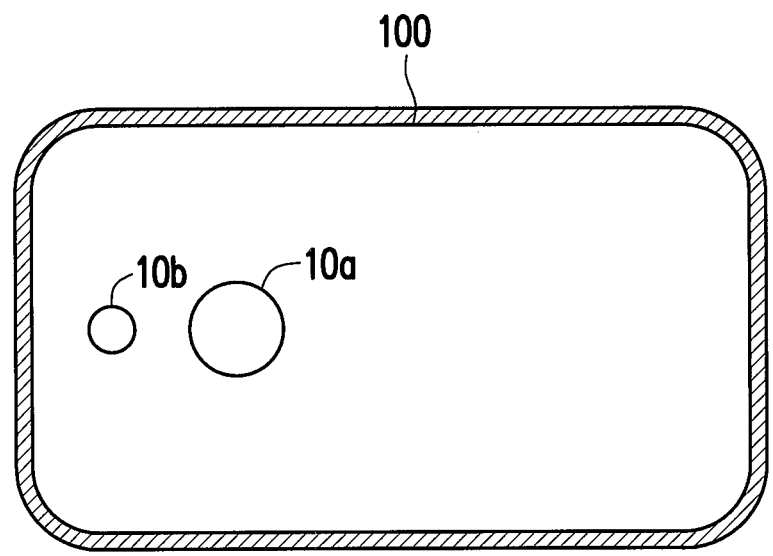
FIG. 3a and FIG. 3b illustrate schematic diagrams of an image capturing device according to an embodiment of the invention.
Figure 3B:
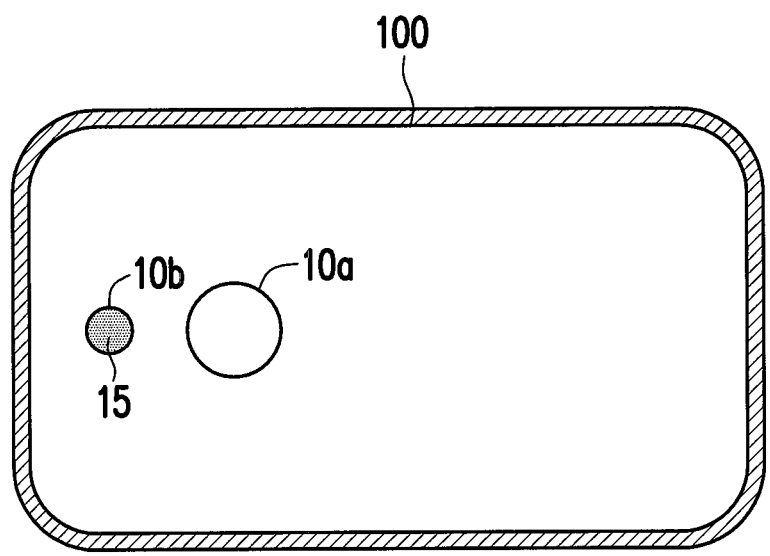

To be specific, FIG. 3a and FIG. 3b illustrate schematic diagrams of an image capturing device according to an embodiment of the invention.

In a manufacturing stage, as illustrated in FIG. 3a, the image capturing module 124 of the image capturing device 100 may capture a light source by using the primary lens 10a and the secondary lens 10b so as to respectively generate a primary testing image and a secondary testing image for constructing the primary-secondary lenses table. In the present embodiment, the light source may be a lightbox. Each of the primary testing image and the secondary testing image may be a white image with a bright center and fading edges. The advantage of using the images of the light source as the primary testing image and the secondary testing image is that the shading portion and its darkness/color shift level may be easily identified. The primary-secondary lenses table may then be constructed according to differences between the primary testing image and the secondary testing image, where such differences are caused by the mechanical properties of the primary lens 10a and the secondary lens 10b.

Also in the manufacturing stage, as illustrated in FIG. 3b, the covering module 122 may cover the secondary lens 10b by using the diffuser, and the image capturing module 124 may capturing the same light source by using the secondary lens 10b covered by the diffuser 15 so as to generate a diffused testing image. Compared with the secondary testing image, the diffused testing image is a white image with uniform brightness. Next, the secondary lens-diffuser table may be constructed based on the differences between the secondary testing image and the diffused testing image respectively generated by the secondary lens 10b before and after being covered.

Accordingly, the image capturing device 100 may be connected to an image processing device in the manufacturing stage, where the image capturing device may be an electronic device with an image processing and computation feature. The image capturing device 100 may transmit the primary testing image, the secondary testing image, and the diffused testing image to the image processing device. The image processing device may calculate a plurality of first ratios according to the primary testing image and the secondary testing image and construct the primary-secondary lenses table by using the first ratios. Each of the first ratios is a ratio of a pixel value of each pixel in the primary testing image to a pixel value of a pixel with a same pixel coordinate in the secondary testing image and represents a correspondence between the two images captured by the primary lens 10a and the secondary lens 10b.

Similarly, the image processing device may also calculate a plurality of second ratios according to the secondary testing image and the diffused testing image and construct the secondary lens-diffuser table by sing the second ratios. Each of the second ratios is a ratio of a pixel value of each pixel in the secondary testing image to a pixel value of a pixel with a same pixel coordinate in the diffused testing image and represents a correspondence between the two images captured by the secondary lens 10b before and after being covered. The primary-secondary lenses table and the secondary lens-diffuser table may be transmitted to the storage unit 20 of the image capturing device 100 after constructed by the image processing device.

Revising FIG. 2, in a photo-shooting stage for the user, after the image capturing module 124 of the image capturing device 100 generates the primary image and the diffused image, the table constructing module 126 constructs a shading compensation table corresponding to the scene by using the primary-secondary lenses table and the secondary lens-diffuser table based on the primary image and the diffused image (Step S206). To be specific, the diffused image may represent ambient light information of the scene being captured. Based on the diffused image, the table constructing module 126 may calculate compensation values or factors required for the primary image captured from the scene by using the primary-secondary lenses table and the secondary lens-diffuser table. Such compensation values or factors are referred to as compensation coefficients.

In the present embodiment, according to the diffused image, the table constructing module 126 may obtain a simulated primary image by using the first ratios in the primary-secondary lenses table and the second ratios in the secondary lens-diffuser table. Next, the table constructing module 126 may calculate the compensation coefficients according to the simulated primary image and the primary image captured by the primary lens 10a. In the present embodiment, each of the compensation coefficients may be a ratio of a pixel value of each pixel in the simulated primary image to a pixel value of a pixel with a same pixel coordinate in the primary image. In another embodiment, the table constructing module 126 may first calculate the ratios and calibrate the ratios based on a model fitting algorithm to obtain the compensation coefficients. The invention is not limited herein. After calculating the compensation coefficients, the table constructing module 126 may construct the shading compensation table according to the pixel coordinate corresponding to each of the compensation coefficients.

Next, the shading compensation module 128 performs a shading compensation process on the primary image according to the shading compensation table so as to generate a compensated image (Step S208). To be specific, the shading compensation module 128 may search for the corresponding compensation coefficient from the shading compensation table according to the pixel value and the pixel coordinate of each of the pixels in the primary image, and then may perform the shading compensation process on each of the pixels in the primary image according to the corresponding compensation coefficient. For example, assume that each of the compensation coefficients is a multiplying factor of the corresponding pixel value. When the shading compensation module 128 performs the shading compensation process on the primary image, each of the pixel values of the primary image may be multiplied by the corresponding multiplying factor, and the compensated image may be thus generated.

It should be noted that, the shading compensation table is constructed in real-time according to the specific scene captured by the image capturing device 100. Hence, the shading compensation table may not need to be reconstructed when another scene is captured under the same light source. In an embodiment, the image capturing device 100 further includes a determining module (not shown). After Step S208 is completed, when the image capturing device 100 captures another image, the determining module may determine whether the ambient light has changed. For example, the determining module may determine whether the ambient light has changed according to settings of the white balance of the image captured device 100. In an embodiment, when the determining module determines that the ambient light has not changed, it represents that the current scene may be the same as the previous scene. Hence, the covering module 122 may not need the diffuser 15 to cover the secondary lens 10b, and the shading compensation module 128 may directly perform the shading compensation process on a new primary image captured by the primary lens according to the same shading compensation table so as to generate a new compensated image.

Figure 4:
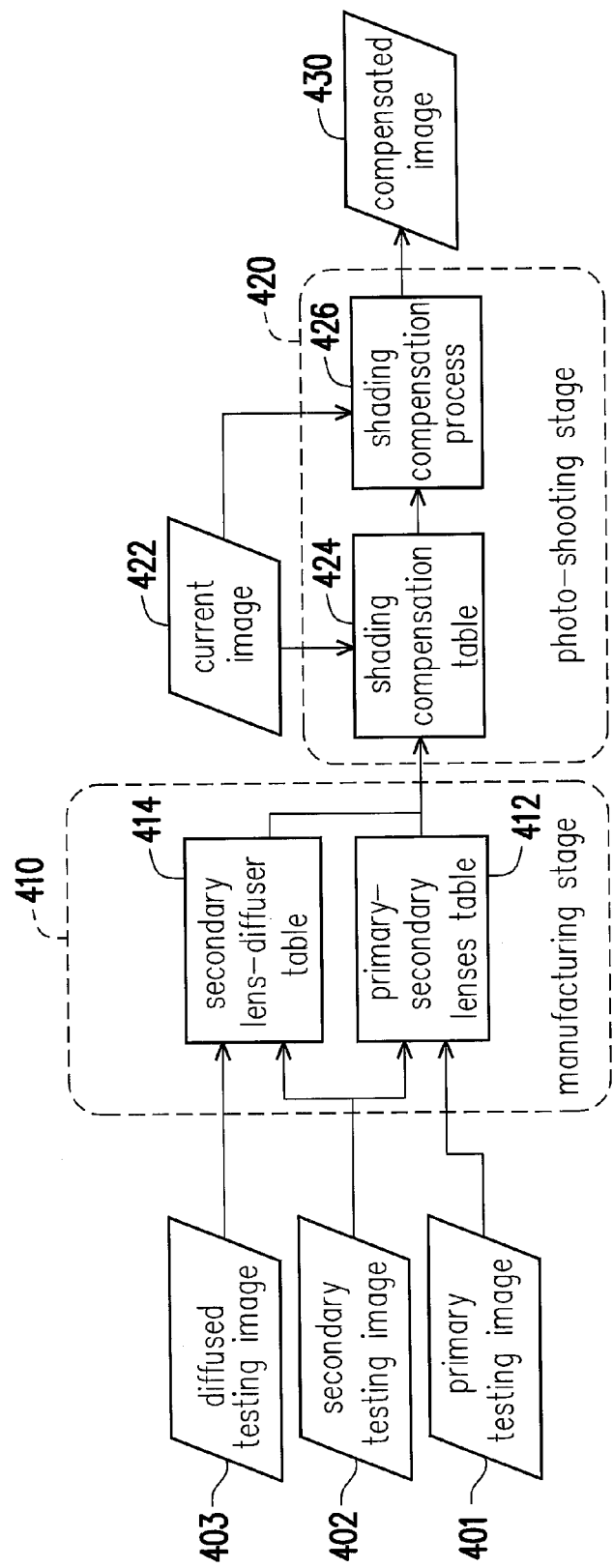
FIG. 4 illustrates a functional block diagram of an image capturing device according to an embodiment of the invention.

The aforementioned shading compensation method of the image capturing device may be summarized by a functional block diagram according to an embodiment of the invention illustrated in FIG. 4.

Referring to FIG. 4, in the proposed method, a primary-secondary lenses table 412 may be constructed based on a primary testing image 401 and a secondary testing image 402, and a secondary lens-diffuser table 414 may be constructed based on the secondary testing image 402 and a diffused testing image 403 in a manufacturing stage 410. Before the image capturing device 100 leaves the factory, the primary-secondary lenses table 412 and the secondary lens-diffuser table 414 may be pre-stored in the storage unit 20. When the user captures a scene with the image capturing device 100 in a photo-shooting stage 420, after the image capturing device 100 captures a current image set 422 including a primary image and a diffuser image, it may generate a shading compensation table 424 corresponding to the scene according to the primary-secondary lenses table 412, the secondary lens-diffuser table 414 and the current image set 422 as well as perform a shading compensation process 426 on the primary image of the current image set 422 according to the shading compensation table 424 so as to output a compensated image 430.

To sum up, according to the image capturing device and the shading compensation method thereof proposed in the invention, a movable diffuser may be disposed in front of a secondary lens of an image capturing device, and a primary-secondary lenses table and a secondary lens-diffuser table may be pre-stored in the image capturing device in a manufacturing stage. In a photo-shooting stage, the image capturing device may use the diffuser to cover the secondary lens so that an image captured by the secondary lens is approximated to an image of a uniformly distributed light source. The image capturing device may further obtain shading compensation information of a captured scene through a real-time computation by using the primary-secondary lenses table and the secondary lens-diffuser table and perform a shading compensation process on the image captured by the primary lens. According to the proposed image capturing device and the shading compensation method in the invention, when a scene is captured, ambient light information of the captured scene may be obtained. Shading compensation tables corresponding to different light sources are not required to be constructed in the manufacturing stage for saving memory space. Moreover, compared with the approach of obtaining a shading compensation table of an unknown light source through an adjustment employed in most of the conventional methods, the shading compensation table proposed in the invention may be adaptively constructed in real-time during image capturing by using ambient light information, and a compensated image with high quality may be obtained accordingly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A shading compensation method of an image capturing device, adapted to an image capturing device having a primary lens, a secondary lens, and a diffuser, wherein the image capturing device pre-stores a primary-secondary lenses table associated with the primary lens and the secondary lens as well as a secondary lens-diffuser table associated with the secondary lens and the diffuser, and wherein the shading compensation method comprises:
    covering the secondary lens by using the diffuser;
    capturing a scene simultaneously by using the primary lens and the secondary lens covered by the diffuser so as to respectively obtain a primary image and a diffused image;
    constructing a shading compensation table corresponding to the scene by using the primary-secondary lenses table and the secondary lens-diffuser table based on the primary image and the diffused image; and
    performing a shading compensation process on the primary image according to the shading compensation table so as to generate a compensated image.

2. The shading compensation method according to claim 1, wherein before the step of covering the secondary lens by using the diffuser, the shading compensation method further comprises:
    capturing a light source by using the primary lens and the secondary lens so as to respectively generate a primary testing image and a secondary testing image;
    covering the secondary lens by using the diffuser, and capturing the light source by using the secondary lens covered by the diffuser so as to generate a diffused testing image; and
    constructing the primary-secondary lenses table based on the primary testing image and the secondary testing image, and constructing the secondary lens-diffuser table based on the secondary testing image and the diffused testing image.

3. The shading compensation method according to claim 2, wherein the steps of constructing the primary-secondary lenses table based on the primary testing image and the secondary testing image, and constructing the secondary lens-diffuser table based on the secondary testing image and the diffused testing image comprise:
    calculating a plurality of first ratios according to the primary testing image and the secondary testing image, and constructing the primary-secondary lenses table according to the first ratios, wherein each of the first ratios is a ratio of a pixel value of each pixel in the primary testing image to a pixel value of a pixel with a same pixel coordinate in the secondary testing image; and
    calculating a plurality of second ratios according to the secondary testing image and the diffused testing image, and constructing the secondary lens-diffuser table according to the second ratios, wherein each of the second ratios is a ratio of a pixel value of each pixel in the secondary testing image to a pixel value of a pixel with a same pixel coordinate in the diffused testing image.

4. The shading compensation method according to claim 3, wherein the step of constructing the shading compensation table corresponding to the scene by using the primary-secondary lenses table and the secondary lens-diffuser table based on the primary image and the diffused image comprises:
    obtaining a simulated primary image according to the diffused image by using the first ratios in the primary-secondary lenses table and the second ratios in the secondary lens-diffuser table;
    calculating a plurality of compensation coefficients according to the simulated primary image and the primary image; and
    constructing the shading compensation table according to the compensation coefficients.

5. The shading compensation method according to claim 4, wherein the step of performing the shading compensation process on the primary image according to the shading compensation table so as to generate the compensated image comprises:
    generating the compensation image according to each of the compensation coefficients in the compensation table and the pixel value of each of the pixels in the primary image.

6. The shading compensation method according to claim 1, wherein after the step of performing the shading compensation process on the primary image according to the shading compensation table so as to generate the compensated image, the shading compensation method further comprises:

when determining that the scene has not changed, capturing the scene by using the primary lens so as to generate a new primary image; and performing the shading compensation process on the new primary image according to the shading compensation table so as to generate a new compensated image.

7. An image capturing device, comprising:

a primary lens;

a secondary lens;

a diffuser, connected to the secondary lens;

a storage unit, recording a plurality of modules, a primary-secondary lenses table associated with the primary lens and the secondary lens, and a secondary lens-diffuser table associated with the secondary lens and the diffuser; and one or more processing units, coupled to the primary lens, the secondary lens, the diffuser, and the storage unit, and accessing and executing the modules recorded in the storage unit, wherein the modules comprise:

a covering module, covering the secondary lens by using the diffuser;

an image capturing module, capturing a scene simultaneously by using the primary lens and the secondary lens covered by the diffuser so as to respectively obtain a primary image and a diffused image;

a table constructing module, constructing a shading compensation table corresponding to the scene by using the primary-secondary lenses table and the secondary lens-diffuser table according to the primary image and the diffused image; and a shading compensation module, performing a shading compensation process on the primary image according to the shading compensation table so as to generate a compensated image.

8. The image capturing device according to claim 7, wherein the image capturing device is further coupled to an image processing device, wherein the image capturing module captures a light source by using the primary lens and the secondary lens so as to respectively generate a primary testing image and a secondary testing image, the covering module covers the secondary lens by using the diffuser, and captures the light source by using the secondary lens covered by the diffuser so as to generate a diffused testing image, and the image processing device constructs the primary-secondary lenses table based on the primary testing image and the secondary testing image, and constructs the secondary lens-diffuser table based on the secondary testing image and the diffused testing image.

9. The image capturing device according to claim 8, wherein the image processing device calculates a plurality of first ratios according to the primary testing image and the secondary testing image, and constructs the primary-secondary lenses table according to the first ratios, wherein each of the first ratios is a ratio of a pixel value of each pixel in the primary testing image to a pixel value of a pixel with a same pixel coordinate in the secondary testing image, and the image processing device calculates a plurality of second ratios according to the secondary testing image and the diffused testing image, and constructs the secondary lens-diffuser table according to the second ratios, wherein each of the second ratios is a ratio of a pixel value of each pixel in the secondary testing image to a pixel value of a pixel with a same pixel coordinate in the diffused testing image.

10. The image capturing device according to claim 9, wherein the table constructing module obtains a simulated primary image according to the diffused image by using the first ratios in the primary-secondary lenses table and the second ratios in the secondary lens-diffuser table, the table constructing module calculates a plurality of compensation coefficients according to the simulated primary image and the primary image, and the table constructing module constructs the shading compensation table according to the compensation coefficients.

11. The image capturing device according to claim 10, wherein the shading compensation module generates the compensation image according to each of the compensation coefficients in the compensation table and the pixel value of each of the pixels in the primary image.

12. The image capturing device according to claim 11 further comprising:

a determining module, wherein when the determining module determines that the scene has not changed, the image capturing module captures the scene by using the primary lens so as to generate a new primary image, and wherein the shading compensation module performs the shading compensation process on the new primary image according to the shading compensation table so as to generate a new compensated image.

\* \* \* \* \*